(12) United States Patent
Anishetty et al.

(10) Patent No.: US 6,424,898 B2
(45) Date of Patent: Jul. 23, 2002

(54) VEHICLE OCCUPANT RESTRAINT CONTROL SYSTEM USING A CRASH SEVERITY MODEL

(75) Inventors: Santosh Anishetty, Plymouth, MI (US); Christopher Michael Caruso; David R. Little, both of Kokomo, IN (US); Russell L. Simpson, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/888,065

(22) Filed: Jun. 22, 2001

Related U.S. Application Data
(60) Provisional application No. 60/214,246, filed on Jun. 23, 2000.

(51) Int. Cl.[7] ............................................... B60R 22/00
(52) U.S. Cl. .................. 701/45; 280/728.1; 280/730.1; 180/273; 307/10.1
(58) Field of Search ...................... 701/45, 46; 180/273, 180/271; 280/728.1, 730.1, 734, 735, 736, 802; 307/10.1

(56) References Cited

U.S. PATENT DOCUMENTS 5,900,677 A * 5/1999 Musiol et al. ............. 307/10.1
6,036,225 A * 3/2000 Foo et al. .................. 280/735

* cited by examiner

Primary Examiner—William A. Cuchlinski, Jr.
Assistant Examiner—Arthur D. Donnelly
(74) Attorney, Agent, or Firm—Robert M. Sigler

(57) ABSTRACT

A vehicle restraint control system provides sophisticated, adaptable control of occupant restraints through the use of a system level architecture to predict the nature of a crash event at the earliest possible time and an occupant injury model to tailor the restraint deployment in an adaptable way to characteristics of the protected vehicle occupant(s) and the nature of the crash event. The occupant injury model derives the potential for injury in a particular vehicle crash in real time as a function of occupant mass, vehicle interior stiffness and occupant impact velocity with respect to the vehicle interior. Peak vehicle crush zone velocity is used as a predictor of occupant impact velocity with the vehicle interior. Predicted occupant impact velocity is preferably adjusted in response to derived impact angle factor, which is derived from orthogonal lateral and longitudinal accelerometers in the vehicle occupant compartment. Vehicle longitudinal velocity may be integrated to predict occupant displacement, relative to the vehicle, as an additional factor used in the control system.

17 Claims, 4 Drawing Sheets

US 6,424,898 B2

VEHICLE OCCUPANT RESTRAINT CONTROL SYSTEM USING A CRASH SEVERITY MODEL

RELATED APPLICATIONS

This application is related to Provisional U.S. patent application Ser. No. 60/214,246, entitled System Level Algorithm for Vehicle Supplemental Inflatable Restraint and filed Jun. 23, 2000, the disclosure of which is incorporated by reference.

TECHNICAL FIELD

The technical field of this invention is control of deployable occupant restraints in vehicles.

BACKGROUND OF THE INVENTION

Deployable occupant restraints have been used to mitigate occupant injuries in vehicle crashes. These restraints are typically stowed in an inactive state to save space or to meet other normal vehicle operating needs and are activated into their occupant restraining configurations in response to detection of a vehicle crash by a sensor system. The restraints then serve to reduce the effects of a secondary impact between the occupant and the portion of the vehicle the occupant strikes. The sensor system must be able to predict the need for restraint deployment well in advance of the time the restraint must be in place to protect the occupant. Such predictions generally involve some method of assessing the probability of occupant injuries for a given crash. These assessments are generally made by conducting and analyzing a multitude of crash tests for a given vehicle design using highly instrumented dummies and determining a few key calibration factors that are hard coded into the restraint deployment control. Such calibration factors generally apply regardless of the characteristics of the vehicle occupant or occupants protected by the restraint(s) of a vehicle at any given time. As knowledge of the performance of the restraints has grown with industry experience, pressure has grown for more sophisticated controls which can distinguish various types of vehicle occupants and tailor the deployment of an occupant restraint to a particular type of occupant. Ideas and designs for such systems are showing up in publications; and requirements concerning such controls are appearing in scheduled governmental regulations. But the proposed designs are generally complicated; and compliance with the regulations is proving difficult due to the complexity of the situation.

SUMMARY OF THE INVENTION

This invention is a vehicle restraint control system that provides sophisticated, adaptable control of occupant restraints through the use of a system level architecture to predict the nature of a crash event at the earliest possible time and a crash severity model to tailor the restraint deployment in an adaptable way to characteristics of the protected vehicle occupant(s) and the nature of the crash event. The crash severity model derives the potential for occupant injury in a particular vehicle crash in real time as a function of a predicted occupant impact velocity with respect to the vehicle interior and preferably also with respect to occupant mass and vehicle interior stiffness. The model may adjust the predicted occupant impact velocity in response to derived impact angle.

In a preferred embodiment, the system determines a peak vehicle crush zone velocity, a vehicle occupant mass, an interior vehicle stiffness and a longitudinal velocity of the vehicle occupant compartment, derives crash severity datum from these determined parameters and determines whether to deploy an occupant restraint at least in response to the crash severity datum. In this embodiment, the peak vehicle crush zone velocity is used as a predictor of occupant impact velocity with the vehicle interior.

In another embodiment, the system additionally determines a lateral velocity of a vehicle occupant compartment, derives an impact angle factor from the lateral velocity of the vehicle occupant compartment and the longitudinal velocity of the vehicle occupant compartment and additionally derives the crash severity datum from the impact angle factor. In another embodiment, the system derives a predicted occupant displacement datum from a time integration of the longitudinal velocity of the vehicle occupant compartment and prevents deployment of the restraint when the occupant is too close to the vehicle interior for the restraint to offer significant help.

DESCRIPTION OF THE PREFERRED EMBODIMENT

Figure 1:
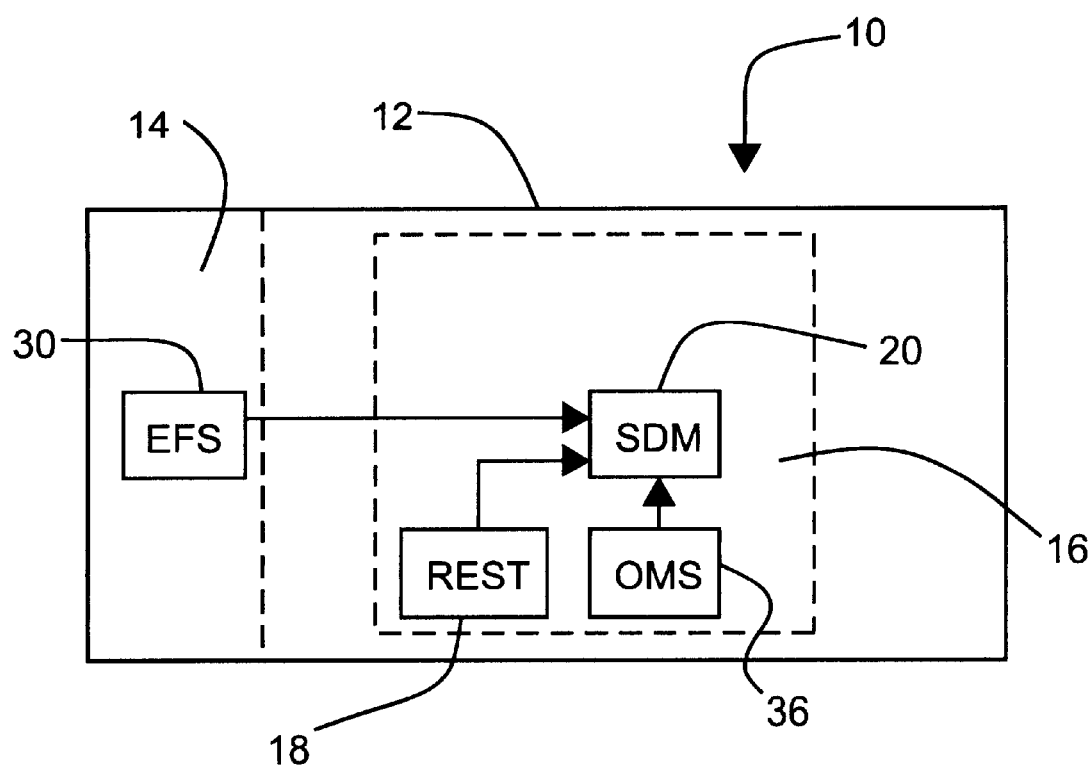
FIG. 1 is a schematic diagram of a vehicle with an occupant restraint and a control system according to this invention.
Figure 2:
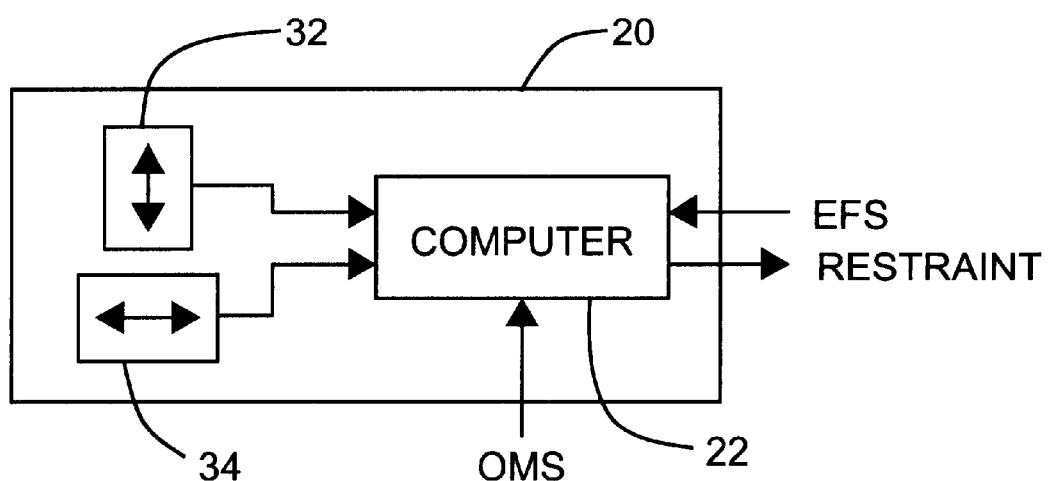
FIG. 2 is a schematic diagram of a Sensing and Diagnostic Module for use in the control system of FIG. 1.

Referring to FIGS. 1 and 2, a vehicle 10 has a body 12 having a front crush zone 14 and a passenger or occupant compartment 16, bounded by dashed lines as shown. At least one occupant restraint 18, in the form of an inflatable restraint or air bag, is stowed in the normal manner and deployed in a crash event. In this embodiment, it is a frontal air bag for the vehicle driver; but it could just as well be any deployable occupant restraint for any vehicle occupant in a defined position within occupant compartment 16.

Deployment of restraint 18 is controlled by a computer 22, such as a microprocessor based digital computer, in a Sensing and Diagnostic Module (SDM) 20 in response to a variety of sensors. Computer 20 may alternatively be a specific digital circuit or an analog device, or combinations of these. A front crash sensor or crush zone sensor 30 (also known as an Electronic Frontal Sensor, EFS) comprises an accelerometer in the front crush zone 14 to provide early data on a frontal crash event. A pair of accelerometers in or near the occupant compartment are preferably packaged adjacent each other in the SDM and are orthogonally oriented laterally and longitudinally as lateral accelerometer 32 and longitudinal accelerometer 34. These accelerometers provide data on deceleration of the occupant containing portion of the vehicle body and are further used, as will be described, to determine the impact angle of a crash event. Each of the sensors provides an acceleration signal which may be mathematically integrated to provide a velocity signal at its location and, in one case, double integrated to provide a distance signal. An occupant mass sensor 36 provides data from which the mass of a vehicle occupant protected by restraint 18 may be determined.

The basic function of the control in SDM 20 is to detect a potential crash event, determine a predicted crash severity in the detected crash event, decide whether to deploy the restraint and deploy the restraint if appropriate. The severity determination is based on a crash severity model stating that the level of severity is proportional to the force with which the occupant strikes the vehicle. This is, in turn, dependent on the mass of the occupant, the impact velocity and the stiffness of the vehicle interior that is impacted. The relationship is expressed mathematically in the following equation, which also accounts for the effect of crashes with impact angles other than pure frontal:

$$I_{OCC} = K_B f(M_{OCC}, \sigma_{INT}, V_{IMP}),$$

Wherein $K_B$ is a basic proportionality constant, $M_{OCC}$ is the mass of the occupant (or part of the occupant) impacting the vehicle, $\sigma_{INT}$ is the stiffness of the interior part of the vehicle impacted by the protected vehicle occupant and $V_{IMP}$ is the impact velocity with which the occupant strikes the vehicle interior. In addition, since the impact velocity is generally derived from a longitudinally oriented sensor but some crash events involve angular impacts, an angle factor $K_\theta$ is also included in the determination. Two of the factors— the basic proportionality constant $K_B$ and the vehicle interior stiffness $\sigma_{INT}$ are calibratable in tests and will not change during vehicle use. They may be stored in system memory ready for use as required. The other parameters are variables derived from the sensors described above; and their derivation will be discussed in detail with respect to the flow charts and graphs described below.

Figure 3:
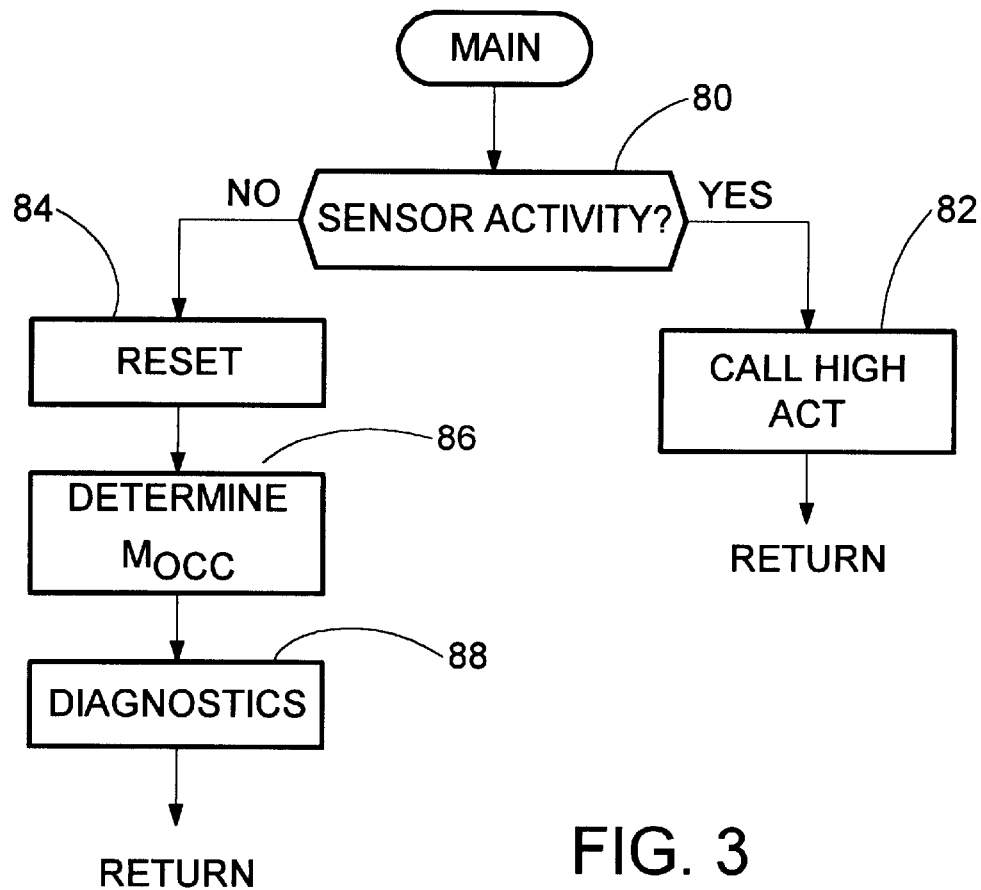
FIGS. 3–5 are flow charts illustrating the operation of the control system of this invention.

The computer in SDM 20 is described with respect to a programmed digital computer that runs a stored program or routine MAIN for the control of restraint deployment as described in the flow chart of FIG. 3. Routine MAIN is run repeatedly in the normal manner on a suitable time basis. The control has basically two modes: high activity and low activity. The high activity mode is called when any of the crash sensors, such as EFS sensor 30 or accelerometers 32 and 34, provides an output signal above a predetermined noise threshold; otherwise, the system remains in the low activity state. If other sensors, such as side crash sensors, are used, these would be included; any sensor in the system may initiate or maintain the high activity state. Generally, the sensor closest to the point of impact will provide the earliest indication of a possible crash event, but other crash sensors may maintain the high activity state if the output of that closest sensor ceases for any reason. When no sensor provides a significant output, however, it is highly likely that the possible crash event is finished.

As shown in FIG. 3, routine MAIN begins at step 80 by checking for any crash sensor activity, as described above. In practice, the SDM is receiving inputs from all sensors at all times during vehicle use; but most of the inputs indicate no significant activity. The activity could be based on acceleration signals as received; but it is also possible, in a system using velocities, to perform the integration of acceleration signals to provide velocity signals within routine MAIN or even in an external device such as a hardware integrator. In this embodiment, the signals received from the sensors are integrated; and decisions concerning sensor activity are based on the velocities derived in the integrations. When sensor activity indicating sufficient velocity for a potential crash event is detected, the routine calls a subroutine HIGH ACT at step 82; and the routine returns for the next loop after returning from the subroutine. But if no such activity is detected, routine MAIN resets or zeros any counters or memory locations used by subroutine HIGH ACT at step 84 and determines an occupant mass $M_{OCC}$ at step 86 from the signal output of OMS sensor 36. The determined occupant mass is used during a future calling of subroutine HIGH ACT, but it is preferably determined before the initiation of the crash event, since the dynamics of a crash event could change the sensor reading. Thus, the value is updated as required until the initiation of the high activity mode and then not changed during the high activity processing. Routine MAIN next performs such diagnostics and/or communication tasks as are required at step 88 and returns for the next loop.

Subroutine HIGH ACT is described with reference to the flow chart of FIG. 4. It begins at step 100 by determining the value $SDMV_{LON}$ of the longitudinal vehicle body occupant compartment velocity, most expeditiously by integrating the signal received from longitudinal accelerometer 34. In the case where the integration is performed externally of sensor 20 or in the MAIN routine, it may just be read from its RAM location. If the accelerometer signal is below the noise threshold, it may be considered effectively zero. At step 102, the subroutine next determines a value of $DISP_{OCC}$, an occupant displacement. This may be derived by integrating the value of $SDMV_{LON}$, since the occupant's body will tend to remain moving at the velocity of the vehicle before the crash event as the vehicle body starts to decelerate. The occupant displacement value $DISP_{OCC}$ indicates how close to the restraint the occupant is likely to be as a crash event proceeds and will be used at a later point in the subroutine to help determine whether to deploy the restraint. For the integrated value to be most accurate, the integration should begin at or before the initial movement of the occupant relative to the vehicle body.

Figure 6:
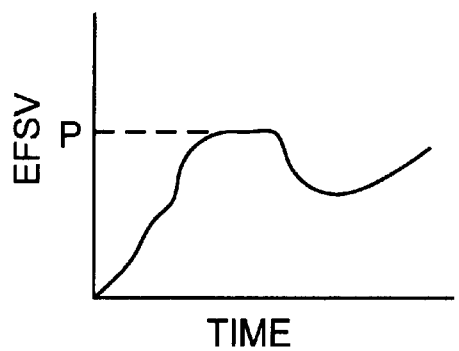
FIGS. 6–9 are graphs illustrating the operation of the control system of this invention.

Next, at step 104, a peak value of the remote, crush zone sensor velocity EFSV is determined and saved. This step involves determining or reading the value of EFSV, the crush zone velocity as derived from the output of sensor 30, and holding the peak value of this velocity from the beginning of the high activity state. At the beginning of a frontal crash event, the vehicle first encounters the crash obstacle in the frontal crush zone, which experiences rapid collapse. This causes a high increase in velocity of EFS sensor 30 toward the rear of the vehicle, as seen in the graph of FIG. 6, which shows EFSV as a function of time in a typical frontal crash event. When the zone has crushed as much as it can and the crash front has passed the sensor, the sensor stops accelerating backwards into the vehicle and may even rebound somewhat. This creates a peak velocity "P", the value of which has been found to be an indication of the future impact velocity facing the vehicle occupant when the crash front reaches the occupant. Thus the occupant impact velocity $V_{IMP}$ is preferably derived from this peak velocity, after the latter has reached its full peak value.

Figure 7:
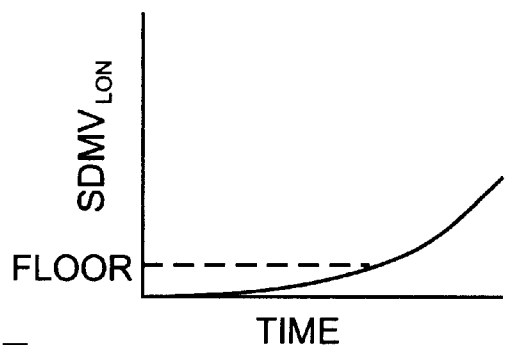

Thus, in step 104, the output signal value of sensor 30 is preferably integrated to produce a crush zone velocity EFSV, if the velocity value is not already available. Successive values of this velocity are compared with a saved peak value (initiated, for example, with zero); and any value greater than the saved peak value replaces it as a new peak value. As seen in the graph of FIG. 7, the time required for $SDMV_{LON}$ to rise to the reference value FLOOR is typically sufficient for the overall peak value "P" to be determined; and this value is thus available for the calculations that follow.

At step 106, subroutine HIGH ACT compares the value of the longitudinal velocity $SDMV_{LON}$ with a reference FLOOR. Reference value FLOOR is greater than the noise threshold for the accelerometer and is the minimum value of $SDMV_{LON}$ for which restraint deployment is permitted. Typically, immediately after the initiation of the high activity state, the value of $SDMV_{LON}$ will be significantly less than FLOOR, as seen in FIG. 7, which respectively show graphs of $SDMV_{LON}$ as a function of time in a typical frontal crash event. If the value of $SDMV_{LON}$ is less than FLOOR, the subroutine returns program control to the MAIN routine. FIGS. 6 and 7 have been prepared on approximately the same time scale for a typical crash event; and a comparison shows that $SDMV_{LON}$ achieves the value of FLOOR typically after a peak value of EFSV has been determined. If the value of $SDMV_{LON}$ exceeds that of FLOOR at step 106, the subroutine proceeds to step 108, wherein an adjusted impact velocity $V_0$ is determined. For convenience of display, this determination will be discussed in the form of another subroutine called from subroutine HIGH ACT.

Figure 5:
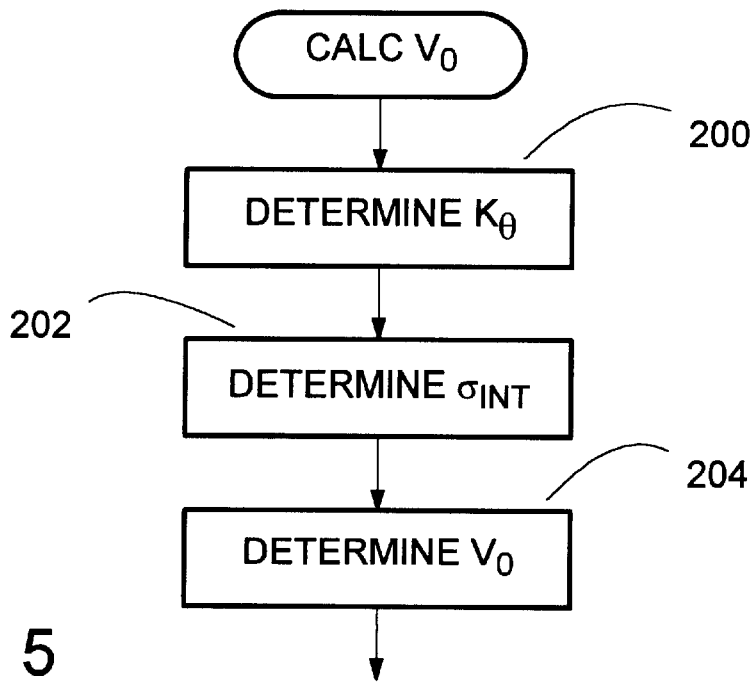

Subroutine CALC $V_0$ is shown in flow chart form in FIG. 5 and essentially begins with the peak value of the crush zone velocity EFSV and adjusts it in response to several derived or stored factors to conform with a crash severity model for the particular potential crash situation. It begins at step 200, wherein an impact angle factor $K_\theta$ is derived from lateral and longitudinal body velocities derived from the outputs of sensors 32 and 34, respectively. The output of lateral accelerometer 32 is read and integrated to provide a lateral velocity signal $SDMV_{LAT}$. The companion longitudinal velocity $SDMV_{LON}$ has already been derived; and it is divided by the lateral velocity to provide the tangent of the angle of impact. To attain a factor more appropriate to the actual directional angle of impact, one would use the cosine of the angle whose tangent is equal to the ratio of $SDMV_{LAT}$ to $SDMV_{LON}$. The mathematical relationship would be:

$$K_\theta = 1/(\cos(\arctan(SDMV_{LAT}/SDMV_{LON})))$$

To save the time and computer resources required to solve this equation, a table look-up may be provided based on the value of the ratio of $SDMV_{LAT}$ to $SDMV_{LON}$. In its simplest form, the table could comprise a single value of $K_\theta$ for use above a predetermined value of the ratio, with the factor below that value being 1.0. This will work reasonably well for a significant range of angles. If more accuracy or angular range is required, more values may be provided: for greatest accuracy, the equation may be used. In any case, the factor $K_\theta$ will preferably be such as to produce no change for an angle of zero or close to zero and produce an adjustment generally increasing with angle, since the actual impact velocity must always be equal to or larger than its longitudinal component.

The subroutine next proceeds to step 202, in which the value of the vehicle interior stiffness factor $\sigma_{INT}$ is read from memory. This may be a single stored value, but a more sophisticated system might store different values for various parts of the vehicle interior likely to be encountered by the occupant's body, depending on the angle of impact. In this latter case, the value used would be chosen on the basis of the impact angle factor $K_\theta$ derived at the previous step 200.

Figure 8:
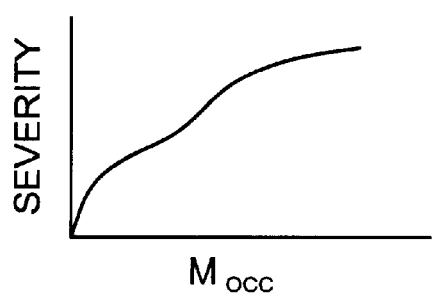
Figure 9:
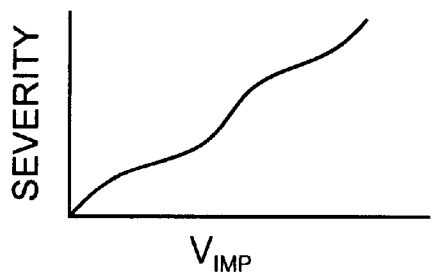

Finally, at step 204, the value of $V_0$ is determined as a function of $M_{OCC}$, $K_\theta$, $\sigma_{INT}$, and $V_{IMP}$, the latter being derived from the peak value "P" of EFSV. The function provided earlier does not need to be linear or continuous; and the preferred method of determination involves table look-ups of intermediate "severity" values represented generally by the curves of FIGS. 8 and 9. FIG. 8 shows a monotonically increasing "severity" relationship for $M_{OCC}$. FIG. 8 shows a monotonically increasing "severity" relationship for $V_{IMP}$. To guarantee the validity of using the peak value of EFSV for $V_{IMP}$, the value FLOOR may be calibrated to be sufficient that the peak value of EFSV has time to be defined. The determination of $V_0$ starts with the assumption that, in a purely frontal crash, $V_0$ will equal the maximum velocity of the crush zone at the front of the vehicle, which is stored peak value of EFSV. This value is multiplied by the impact angle factor $K_\theta$ to correct for the measured angle of impact and is then also multiplied, in turn, by the "severity" value for occupant mass to adjust for the particular protected occupant and the chosen value of $\sigma_{INT}$ to adjust for the stiffness of the impacted surface in the interior of the vehicle. The resulting value $V_{IMP}$ is multiplied by its own "severity" value to obtain $V_0$, a measure of the severity of the crash event based on the crash severity model.

Figure 4:
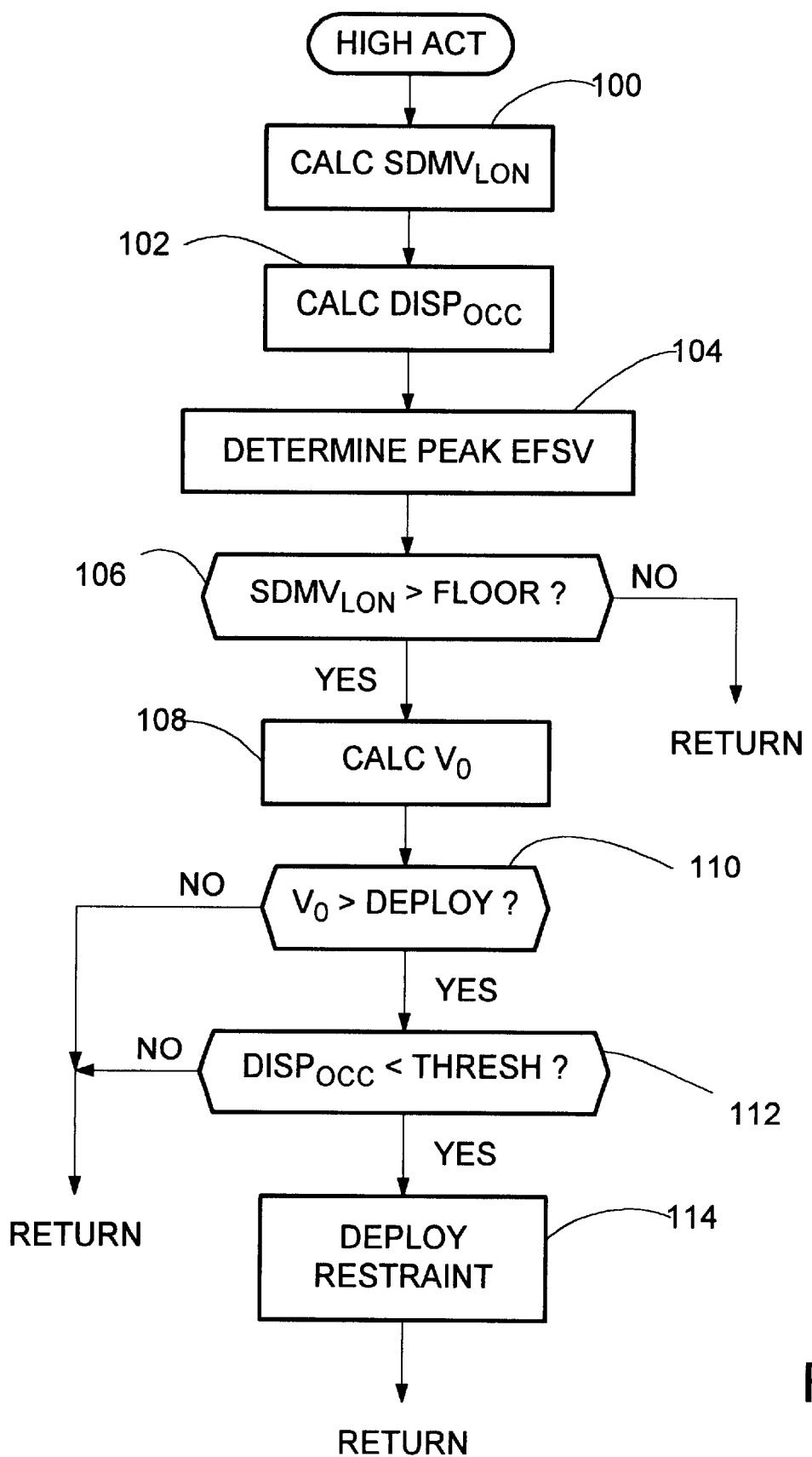

Returning to subroutine HIGH ACT in FIG. 4, the value of $V_0$ is compared to a predetermined threshold value DEPLOY to determine whether or not it is sufficient to deploy restraint 18. If it does not exceed the value DEPLOY, the restraint is not deployed; program execution returns from the subroutine to routine MAIN. If it does exceed the value DEPLOY, another test is performed, since restraint deployment may still be undesirable. In some crash events, there is a window of opportunity for restraint deployment that may end before deployment is authorized. Typically, the end of the period is determined by the time required for the protected occupant to move forward sufficiently close to the interior of the vehicle that the restraint will provide little or no benefit. The method and apparatus described herein offers a way of determining if there is sufficient room or space between the occupant and the restraint to permit useful deployment. This is accomplished at step 114 by comparing the value of $DISP_{OCC}$ to a threshold THRESH. The value of $DISP_{OCC}$ is the predicted travel of the occupant relative to the vehicle occupant compartment and thus to the as yet undeployed restraint. The value of THRESH represents an occupant travel distance toward the restraint in which the potential benefit of the restraint does not warrant its deployment. Thus, if the value of $DISP_{OCC}$ is not less than THRESH, deployment is not authorized; and program execution returns from the subroutine to routine MAIN. But if the value of $DISP_{OCC}$ is less than THRESH, the subroutine proceeds to step 114 and orders deployment of the restraint. In a sophisticated system, the one of the values of $DISP_{OCC}$ and THRESH may be modified by the impact angle factor $K_\theta$ to compensate for an oblique movement of the occupant with respect to the restraint or a different distance to a different restraint in an angled crash. With the restraint deployed at step 114, program execution returns from subroutine HIGH ACT to routine MAIN.

What is claimed is:

1. A method of controlling deployment of a vehicle occupant restraint in a vehicle occupant compartment comprising the steps:

determining a peak vehicle frontal crush zone velocity;

determining a vehicle occupant mass;

determining an interior vehicle stiffness;

determining a longitudinal velocity of the vehicle occupant compartment;

deriving a crash severity datum from the peak vehicle frontal crush zone velocity, the vehicle occupant mass, the interior vehicle stiffness, and the longitudinal velocity of the vehicle occupant compartment; and determining a deployment of an occupant restraint at least in response to the crash severity datum.

2. A method according to claim 1 further comprising the step of determining an impact angle factor, wherein the crash severity datum is further derived from the impact angle factor.

3. A method according to claim 2 further comprising the step of determining a lateral velocity of the vehicle occupant compartment, wherein the impact angle factor is derived from the lateral velocity of the vehicle occupant compartment and the longitudinal velocity of the vehicle occupant compartment.

4. A method according to claim 3 wherein the lateral and longitudinal velocities of the vehicle occupant compartment are derived from orthogonally aligned accelerometers responsive to accelerations of the vehicle occupant compartment.

5. A method according to claim 1 further comprising the step of deriving a predicted occupant displacement datum, wherein the step of determining whether to deploy an occupant restraint is further responsive to the occupant displacement datum.

6. A method according to claim 5 wherein the occupant displacement datum is derived from a time integration of the longitudinal velocity of the vehicle occupant compartment.

7. A method according to claim 2 further comprising the step of deriving a predicted occupant displacement datum, wherein the step of determining whether to deploy an occupant restraint is further responsive to the occupant displacement datum.

8. A method according to claim 7 wherein the occupant displacement datum is derived from a time integration of the longitudinal velocity of the vehicle occupant compartment.

9. A method of controlling deployment of a vehicle occupant restraint in a vehicle occupant compartment comprising the steps:

determining a peak vehicle frontal crush zone velocity;

sensing a pair of orthogonal accelerations of the vehicle occupant compartment;

determining an impact angle factor from the pair of orthogonal accelerations of the vehicle occupant compartment;

modifying the peak vehicle frontal crush zone velocity in response to the impact angle factor;

deriving a crash severity datum at least from the modified peak vehicle frontal crush zone velocity; and determining a deployment of an occupant restraint at least in response to the crash severity datum.

10. A method of controlling deployment of a vehicle occupant restraint in a vehicle occupant compartment comprising the steps:

sensing a pair of orthogonal accelerations of the vehicle occupant compartment;

determining lateral and longitudinal velocities of the occupant compartment from the pair of sensed orthogonal accelerations;

deriving an impact angle factor from the sensed lateral and longitudinal velocities of the occupant compartment; and determining a deployment of a vehicle occupant restraint based on the longitudinal velocity of the occupant compartment and the impact angle factor.

11. A vehicle restraint deployment control comprising, in combination:

means for determining a peak vehicle frontal crush zone velocity;

means for determining a vehicle occupant mass;

means for determining an interior vehicle stiffness;

means for determining a longitudinal velocity of the vehicle occupant compartment;

means for deriving a crash severity datum from the peak vehicle frontal crush zone velocity, the vehicle occupant mass, the interior vehicle stiffness, and the longitudinal velocity of the vehicle occupant compartment; and means for determining a deployment of an occupant restraint at least in response to the crash severity datum.

12. The vehicle restraint deployment control of claim 11 further comprising means for determining an impact angle factor, wherein the means for determining a crash severity datum is further responsive to the impact angle factor.

13. The vehicle restraint deployment control of claim 12 further comprising means for determining a lateral velocity of the vehicle occupant compartment, wherein the impact angle factor is derived from the lateral velocity of the vehicle occupant compartment and the longitudinal velocity of the vehicle occupant compartment.

14. The vehicle restraint deployment control of claim 13 wherein the means for determining a lateral velocity of the vehicle occupant compartment and the means for determining a longitudinal velocity of the vehicle occupant compartment comprise a pair of orthogonally aligned accelerometers responsive to accelerations of the vehicle occupant compartment.

15. A vehicle restraint deployment control comprising, in combination:

a first accelerometer adapted for mounting in a frontal crush zone of a vehicle;

an occupant weight sensor; and a control module adapted for inclusion in a vehicle occupant compartment, the control module comprising a pair of orthogonally aligned accelerometers responsive to accelerations in a horizontal plane and a control computer comprising:

means for determining, responsive to at least one of the pair of orthogonally aligned accelerometers, a longitudinal velocity of the vehicle occupant compartment;

means for determining, responsive to the first accelerometer and the longitudinal velocity of the vehicle occupant compartment, a peak crush zone velocity;

means for deriving a crash severity datum from the peak vehicle frontal crush zone velocity, the vehicle occupant mass, the interior vehicle stiffness, and the longitudinal velocity of the vehicle occupant compartment; and means for determining a deployment of an occupant restraint at least in response to the crash severity datum.

16. The vehicle restraint deployment control of claim 15 further comprising means for determining, in response to the pair of orthogonally aligned accelerometers, an impact angle factor and further means for modifying the crash severity datum to compensate for non-longitudinal impact angles.

17. The vehicle restraint deployment control of claim 15 further comprising means for time integrating the longitudinal velocity to generate an occupant displacement datum and means responsive to the occupant displacement datum for selectively preventing deployment of the restraint.

* * * * *